(12) United States Patent
Barbolini

(10) Patent No.: US 12,209,887 B2
(45) Date of Patent: Jan. 28, 2025

(54) METHOD FOR ESTIMATING, BY MEANS OF MEASUREMENTS WITH AN INDUCTIVE SENSOR, THE TIME FOR WHICH AN ENDOTHERMIC MOTOR HAS OPERATED AT THE PREDETERMINED SPEEDS, AND APPARATUS FOR IMPLEMENTING SUCH METHOD

(71) Applicant: EMAK S.P.A., Bagnolo In Piano (IT)

(72) Inventor: Gianluca Barbolini, Modena (IT)

(73) Assignee: EMAK S.P.A., Bagnolo in Piano (IT)

( * ) Notice: Subject to any disclaimer, the term of this patent is extended or adjusted under 35 U.S.C. 154(b) by 166 days.

(21) Appl. No.: 17/926,544

(22) PCT Filed: May 5, 2021

(86) PCT No.: PCT/IB2021/053775
§ 371 (c)(1),
(2) Date: Nov. 18, 2022

(87) PCT Pub. No.: WO2021/234489
PCT Pub. Date: Nov. 25, 2021

(65) Prior Publication Data
US 2023/0204390 A1    Jun. 29, 2023

(30) Foreign Application Priority Data

May 21, 2020   (IT) .................. 102020000011872

(51) Int. Cl.
*G01D 5/20* (2006.01)
*G07C 3/02* (2006.01)

(52) U.S. Cl.
CPC ...... *G01D 5/20* (2013.01); *G07C 3/02* (2013.01)

(58) Field of Classification Search
CPC .... G01D 5/20; G07C 3/02; G07C 3/00; G01P 21/02; G01P 3/4807
See application file for complete search history.

(56) References Cited

U.S. PATENT DOCUMENTS

| 4,853,859 A | 8/1989 | Morita et al. |
| 5,043,659 A | 8/1991 | Lowmiller et al. |
| 2011/0005787 A1* | 1/2011 | Friberg .................... G07C 3/00 173/20 |

FOREIGN PATENT DOCUMENTS

| EP | 0793077 B1 | 9/2001 | |
| JP | S58 60212 A | 4/1983 | |
| WO | WO-2018196862 A1 * | 11/2018 | ............. G01R 31/36 |

* cited by examiner

*Primary Examiner* — Feba Pothen
(74) *Attorney, Agent, or Firm* — Volpe Koenig

(57) ABSTRACT

A method is described for estimating, by measurements taken by an inductive sensor, the time for which an endothermic motor of a tool has operated at predetermined rotating speeds, and an apparatus implementing the method also described. The method in particular includes cyclically measuring, at a pre-set sampling period, an overall time interval by starting at the beginning of the measuring of the overall time interval when a first variation peak of the electromagnetic field is sensed and terminating the measuring of the overall time interval when a last variation peak of the electromagnetic field is sensed. The first and the last peaks are the start and tail ends of a sequence of peaks having a predetermined number of successive peaks, the number of peaks being positive, whole, at least equal to six and a least common multiple of two and three.

5 Claims, 4 Drawing Sheets

METHOD FOR ESTIMATING, BY MEANS OF MEASUREMENTS WITH AN INDUCTIVE SENSOR, THE TIME FOR WHICH AN ENDOTHERMIC MOTOR HAS OPERATED AT THE PREDETERMINED SPEEDS, AND APPARATUS FOR IMPLEMENTING SUCH METHOD

TECHNICAL FIELD

The present invention relates to a method for estimating the time for which an endothermic motor has operated at given rotating speeds, said method in particular being adapted to be applied to endothermic motors of landscaping tools.

BACKGROUND

Accessories, i.e. after-market devices, are known which are adapted to be coupled to a gardening tool actuated by an endothermic motor, such as for example a chainsaw, a brush cutter or a blower, to automatically measure the operating hours thereof.

A type of such accessories comprises an inductive sensor for taking such measurement of the operating hours. Such inductive sensor allows measuring the variations in electromagnetic field generated from the passage of the current required to generate a spark in the combustion chamber of the endothermic motor and/or from the magnets present in the free wheel of the endothermic motor. Inductive sensors are particularly advantageous in this type of accessories because they have a very low, if not zero, energy consumption, and therefore they allow long-lasting battery-operated devices to be made.

Generally, they are used only to sense if the motor is ON or OFF. However, measuring the overall operating time of the motor is a limited piece of information within the realm of monitoring the wear of the tool. An example of the wear of a tool that has operated the whole time with the motor at maximum rotating speed certainly will have greater wear with respect to a tool that has operated for the same number of hours but under less burdensome conditions.

It is possible to measure, by means of an inductive sensor, the magnetic field variations (in the form of peaks) due to the sparking of the spark-plug that are directly representative of the revolutions per minute. For example, the number of sparks in a two-stroke in the unit of time corresponds to the number of revolutions in the unit of time. Therefore, sensing the number of sparks would determine the frequency of the rotating speed, i.e. the number of revolutions in the unit of time, which may then be conveniently converted into the number of revolutions per minute (rpm).

However, depending on the points of the tool where the accessory provided with the inductive sensor is positioned, or better, where it is possible to position it given that at times its positioning is mandatory due to the shape of the tool, also other electromagnetic variations, mainly due to the rotation of the magnets of the free wheel of the motor, can be sensed overlapping the variation in electromagnetic field due to the sparking spark.

Moreover, the intensity of the variations in electromagnetic field caused by the free wheel depend on the position and orientation of the inductive sensor with respect to the motor. Furthermore, they are not always linearly proportional to the number of revolutions of the motor along the whole range of operating rotating speeds of the motor.

Such problems therefore making it impossible to calculate the rotating speeds based simply on counting the variations in magnetic field, i.e. the variation peaks of the magnetic field.

SUMMARY

It is an object of the present invention to overcome the drawbacks of the known technique within the scope of a rational, affordable solution that requires a constrained computational time. Such object is achieved by the features of the invention indicated in the independent claim. The dependent claims outline preferred and/or particularly advantageous aspects of the invention.

The invention makes available a method for estimating, by means of measurements taken by means of an inductive sensor, the time for which an endothermic motor of a tool has operated at predetermined rotating speeds.

Said method comprises the following steps:

cyclically measuring, at a pre-set sampling period, an overall time interval by starting at the beginning of the measuring of the overall time interval when a first variation peak of the electromagnetic field is sensed and terminating the measuring of the overall time interval when a last variation peak of the electromagnetic field is sensed, where the first and the last peak are the start and tail ends of a sequence of peaks having a predetermined number of successive peaks, said number of peaks being positive, whole, at least equal to six and a least common multiple of two and three, obtaining, from the overall time interval measured, the respective frequency thereof, making available a plurality of pre-set ranges of frequencies of the overall time intervals measured, increasing the number of occurrences of a corresponding pre-set range of frequencies by one each time an overall time interval having a frequency falling within the pre-set range of frequencies is measured, selecting, among the plurality of pre-set ranges of frequencies, the two pre-set ranges of frequencies having the largest number of occurrences, of which the one with the lowest frequency represents the range of the minimum speed and the one with the highest frequency represents the range of the maximum speed, calculating an overall threshold frequency by calculating an arithmetic average between at least one frequency of the range of the minimum speed and one frequency of the range of the maximum speed, determining a plurality of corrective coefficients, each obtained by dividing the number of peaks of the sequence of peaks respectively by one, and for each of the whole and positive numbers of which the number of peaks is a least common multiple, calculating a plurality of rotation frequencies by multiplying, for each corrective coefficient of the plurality of corrective coefficients, a frequency value of the range of frequencies of the minimum speed, comparing the values of the calculated rotation frequencies with a pre-set reference range of frequencies indicative of the idling of the endothermic motor, storing the corrective coefficient of the plurality of corrective coefficients corresponding to the rotation frequency falling within the reference range of frequencies indicative of the idling of the endothermic motor, as a corrective coefficient of the low speeds, calculating a representative rotation frequency for each pre-set range of frequencies which are lower than the threshold frequency by multiplying a frequency value of each range by the corrective coefficient of the low speeds, storing the calculated representative rotation frequencies, calculating a plurality of rotation frequencies by multiplying, for each corrective coefficient of the plurality of corrective coefficients, a frequency value of the range of frequencies of the maximum speed, comparing the values of the calculated rotation frequencies with a reference range of frequencies indicative of the maximum running of the endothermic motor, storing the corrective factor corresponding to the rotation frequency falling within the pre-set range of frequencies indicative of the maximum running of the endothermic motor as corrective factor of the high speeds, calculating a representative rotation frequency for each range of frequencies which are greater than the threshold frequency by multiplying a frequency value of each range greater than the threshold frequency by the corrective factor of the high speeds, storing the calculated representative rotation frequencies, and determining the operating time in which the motor has operated at the rotation frequencies of each range of frequencies by multiplying the number of occurrences of each range of frequencies by the value of the pre-set sampling period.

Thanks to such solution, a method is made available that is capable of providing an accurate estimate of the operating time in which the motor operated about a given rotating speed, or also at precise rotating speeds if the pre-set ranges of frequencies are particularly small, based on information, i.e. on the only information of variation in magnetic field measured by an inductive sensor. In particular, such method is based on the fact that when the variations in magnetic field generated by an endothermic motor are measured, mainly three situations may occur according to the position and orientation of the inductive sensor and according to the rotating speeds.

A first situation is the one in which each variation peak of the magnetic field is due to the sparking spark. Such first situation is exemplified in FIG. 5 with a graph of the intensity of the variation in magnetic field over time, where the peaks due to the sparking spark are indicated with PS.

A second situation is the one in which a variation in magnetic field due to the rotation of the magnets of the free wheel is interposed between two variation peaks of the magnetic field due to the sparking spark. Such second situation is illustrated in FIGS. 6 and 7 with a graph of the intensity of the variation in magnetic field over time, where the peaks due to the sparking spark are indicated with PS, and the peaks due to the rotation of the free wheel are indicated with PW.

A third situation is the one in which two variations in magnetic field due to the rotation of the magnets of the free wheel are interposed between two variation peaks of the magnetic field due to the sparking spark.

Therefore, given that generally there is an electromagnetic variation peak due to the sparking spark of each one, two or three measured variation peaks in the electromagnetic field, by measuring the time interval between a whole and positive number of successive peaks that is a least common multiple of two and three, i.e. six, it is ensured that it is possible to sense, within each sampling period, the time interval between at least two electromagnetic variation peaks due to the sparking spark. Therefore, it is ensured in the first and in the second and in the third situation that it is possible to sense the time interval between at least two electromagnetic variation peaks due to the sparking spark, which are indicative of the number of revolutions of the motor. Experimental data have also shown that under certain, less frequent conditions, there may be a situation in which there are interposed more than two variations in magnetic field due to interferences generated by the rotation of the free wheel between two variations in magnetic field due to the sparking spark. Therefore, for example, to improve the versatility of the method, it is possible to optionally measure the overall time interval of a sequence of successive peaks in a number that is a least common multiple of two, three and four, therefore twelve, or in a number that is a least common multiple of two, three, four and five, therefore sixty.

Therefore, it substantially is important to measure the variation in electromagnetic field while considering a sequence of peaks that is a least common multiple of the possible distances between two successive peaks due to the sparking spark.

The measurement every six peaks allows having an optimum accuracy and simultaneously obtaining an energy saving because there is less consumption in recording six peaks each sampling period with respect to twelve or sixty peaks.

Furthermore, although the method cannot accurately calculate the rotating speeds in the passage from one situation to another, during the use of these tools, the motor is always either at maximum speed or minimum speed and remains for such little time at intermediate speeds at which the aforesaid transitions occur, and the transition is so quick that such error is completely irrelevant in the computation of the overall hours of use.

An aspect of the invention provides for the method to comprise the following steps:

making available a database of a plurality of types of tools provided with endothermic motors, in which each type of tool is associated with a reference range of frequencies indicative of the maximum running of the endothermic motor of said type of tool, allowing the selection of a type of tool from the database of the plurality of types of tools, and using the reference range of frequencies indicative of the maximum running of the endothermic motor associated with the type of tool selected to perform the comparison step between the values of the calculated rotation frequencies with the pre-set frequency range indicative of the maximum running of the endothermic motor.

In this manner, it is possible to broaden the use of the method to several tools using one device alone because not all tools have the same maximum rotation speeds.

Moreover, such features allow making the method more accurate with respect to implementing a single and broad reference range of frequencies indicative of the maximum running of the endothermic motor.

According to another aspect of the invention, the step of measuring at least one predetermined overall number of time intervals may comprise the step of accelerating the endothermic motor of the tool at least once from the idling rotating speed to the maximum rotating speed.

The invention also makes available an apparatus for the deferred estimation of the time for which an endothermic motor of a tool has operated at predetermined rotating speeds, said apparatus comprising an acquisition device provided with:

an inductive sensor, a storage unit, a wireless transmitter, a power supply battery, an electronic control and command unit operatively connected to the inductive sensor, the wireless transmitter and the storage unit, and configured to:

cyclically measure, at a pre-set sampling period, an overall time interval by starting at the beginning of the measuring of the overall time interval when a first variation peak of the electromagnetic field is sensed and terminate the measuring of the overall time interval when a last variation peak of the electromagnetic field is sensed, where the first and the last peak are the start and tail ends of a sequence of peaks having a predetermined number of successive peaks, said number of peaks being positive, whole, at least equal to six and a least common multiple of two and three, obtain, from the overall time interval measured, the respective frequency thereof, make available a plurality of pre-set ranges of frequencies of the overall time intervals measured, increase the number of occurrences of a corresponding pre-set range of frequencies by one each time an overall time interval having a frequency falling within the pre-set range of frequencies is measured, said apparatus further comprising a remote device provided with:

a wireless receiver a processing unit operatively connected to the wireless receiver and configured to:

select two pre-set ranges of frequencies of the plurality of pre-set ranges of frequencies having the largest number of occurrences, of which the one with the lowest frequency represents the range of the minimum speed and the one with the highest frequency represents the range of the maximum speed, calculate an overall threshold frequency by calculating an arithmetic average between at least one frequency of the range of the minimum speed and one frequency of the range of the maximum speed, determine a plurality of corrective coefficients, each obtained by dividing the number of peaks of the sequence of peaks respectively by one, and for each of the whole and positive numbers of which the number of peaks is a least common multiple, calculate a plurality of rotation frequencies by multiplying, for each corrective coefficient of the plurality of corrective coefficients, a frequency value of the range of frequencies of the minimum speed, compare the values of the calculated rotation frequencies with a pre-set reference range of frequencies indicative of the idling of the endothermic motor, store the corrective coefficient of the plurality of corrective coefficients corresponding to the rotation frequency falling within the reference range of frequencies indicative of the idling of the endothermic motor, as a corrective coefficient of the low speeds, calculate a representative rotation frequency for each pre-set range of frequencies which are lower than the threshold frequency by multiplying a frequency value of each range by the corrective coefficient of the low speeds, store the calculated representative rotation frequencies, calculate a plurality of rotation frequencies by multiplying, for each corrective coefficient of the plurality of corrective coefficients, a frequency value of the range of frequencies of the maximum speed, compare the values of the calculated rotation frequencies with a reference range of frequencies indicative of the maximum running of the endothermic motor, store the corrective factor corresponding to the rotation frequency falling within the pre-set range of frequencies indicative of the maximum running of the endothermic motor as corrective factor of the high speeds, calculate a representative rotation frequency for each range of frequencies which are greater than the threshold frequency by multiplying a frequency value of each range greater than the threshold frequency by the corrective factor of the high speeds, store the calculated representative rotation frequencies, and determine the operating time in which the motor has operated at the rotation frequencies of each range of frequencies by multiplying the number of occurrences of each range of frequencies by the value of the pre-set sampling period.

Thanks to this solution, an apparatus is made available that is capable of accurately estimating the number of operating hours of the tool with which it is associated and that requires less frequent maintenance intervals than the battery of the acquisition device with respect to the case in which the data are processed by the acquisition device itself since the energy consumption due to the data processing is transferred to a remote device.

According to another aspect of the invention, the remote device may comprise a displaying device and the processing unit is configured to show a report on the displaying device showing, for each calculated representative rotation frequency value, the operating time associated therewith.

BRIEF DESCRIPTION OF THE DRAWINGS

Further features and advantages of the invention will be more apparent after reading the following description provided by way of a non-limiting example, with the aid of the accompanying drawings.

DETAILED DESCRIPTION OF THE INVENTION

Figure 1:
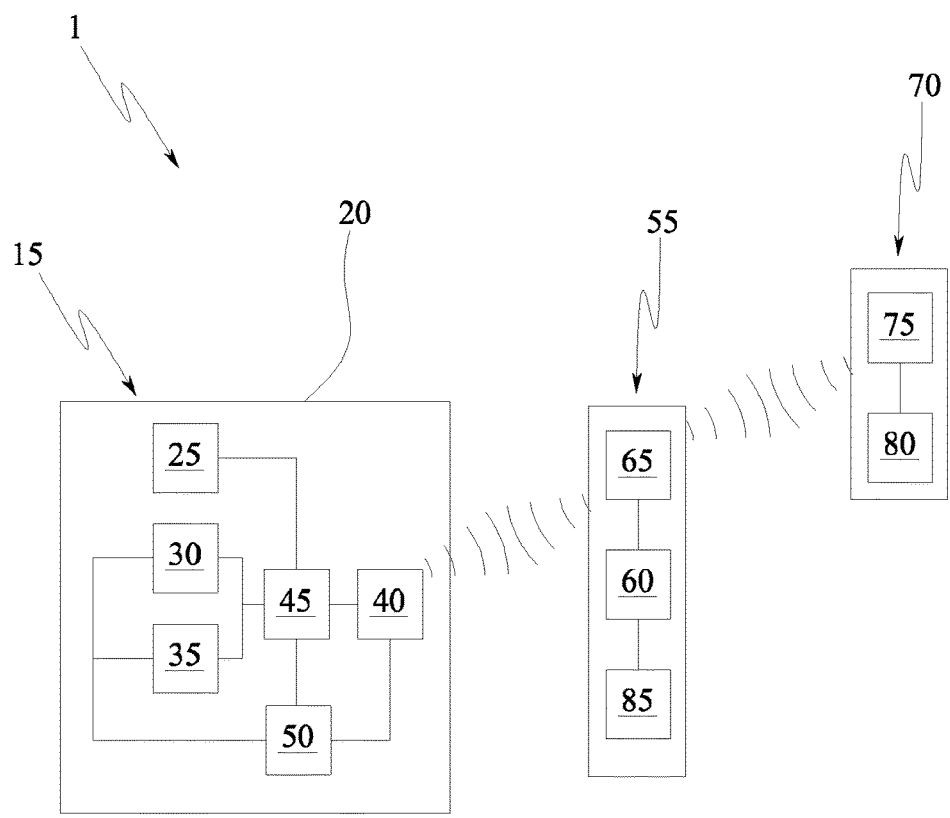
FIG. 1 is a diagrammatic depiction of an apparatus for the deferred estimation of the time for which an endothermic motor of a tool has operated at predetermined rotating speeds, according to the invention.
Figure 2:
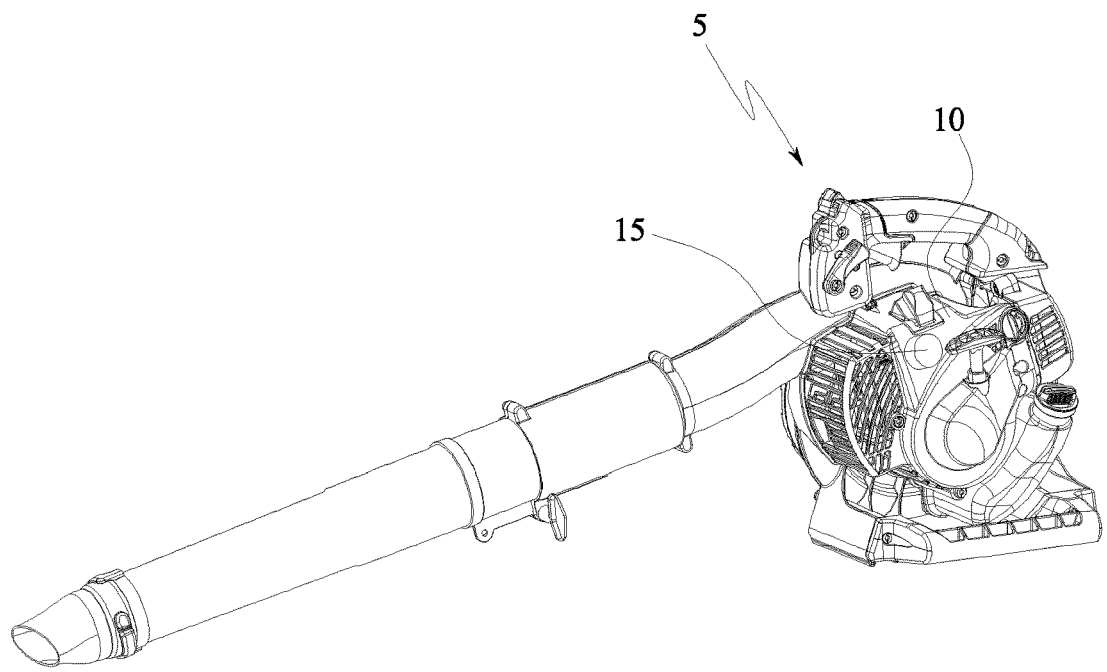
FIG. 2 is a view of a tool provided with an endothermic motor, on which an acquisition device of the apparatus of FIG. 1 is installed.

An apparatus for estimating the time for which an endothermic motor of a tool has operated at predetermined rotating speeds is indicated as a whole with 1, i.e. at about predetermined rotating speeds, in particular at least at one between the minimum rotating speed and the maximum rotating speed.

In particular, such estimate is differed, i.e. not in real time during the operation of the endothermic motor.

Said tool is preferably a landscaping tool, such as for example a chainsaw, a blower (shown in the drawings with number 5), a brush cutter, a hedge cutter, a lawn trimmer or a motor hoe.

Such tools are all provided with an endothermic motor, for example of the two-stroke type, housed in a protective crankcase 10, for example made of plastic material. Such protective crankcase may also make available a grasping portion of the tool, such as for example a handle.

During use, the engine works for almost the entire time either at a maximum rotation speed or at a minimum rotation speed.

The apparatus 1 comprises an acquisition device 15 provided with a casing 20, for example a box-like casing, inside of which an inductive sensor 25 is housed that is capable of measuring variations in magnetic and/or electromagnetic field.

Such inductive sensor comprises a spiral-wound electrically conductive wire and/or a coil made of electrically conductive material.

In the case of an endothermic motor, said variations in electromagnetic field are mainly due to the passage of an electric current through a respective wire of the motor to generate the sparking spark in combustion chamber, and/or from the rotation of the free wheel of the motor.

The acquisition device 15 comprises a storage unit that is directly housed in the casing 20. In particular, the storage unit comprises a volatile storage device 30, commonly known as RAM, and a non-volatile storage device 35.

It is worth noting that volatile storage device means a storage device that if it is not powered, loses the data stored therein, while a non-volatile storage device is designed so as to keep the data stored also if not powered.

The acquisition device 15 also comprises a wireless transmitter housed in the casing 20, for example of the Bluetooth or WLAN type. The acquisition device 15 preferably also comprises a transceiver 40 housed in the casing 20, for example of the Bluetooth or WLAN type, so as to also receive external commands.

Moreover, the acquisition device 15 comprises an electronic control and command unit 45 operatively connected to the inductive sensor 25, the wireless transmitter, i.e. the wireless transceiver 40 and the storage unit, i.e. volatile storage 30 and non-volatile storage 35, it also housed in the casing 20.

The acquisition device 15, i.e. the components thereof, is powered by means of a source of electric energy, for example a battery 50, housed in the casing 20. The battery 50 is for example, a coin-type battery.

Preferably, the inductive sensor 25 is powered by the battery 50.

The apparatus 1 also comprises a remote device 55 configured to wirelessly interface with the acquisition device 15. Said remote device 55 may comprise a wireless receiver and a processing unit 60 connected to the wireless receiver and configured to process the data acquired by the acquisition device. The remote device preferably comprises a wireless transceiver 65, for example of the Bluetooth or WLAN type, so as to both receive data from the acquisition device and send commands.

The remote device 55 may for example, be a smartphone.

The apparatus 1 may also comprise a further remote device 70 provided with a wireless transceiver 75 and a processing unit 80 configured to process the data acquired by the acquisition device. In this case, the remote device 55 is to comprise the wireless transceiver configured to transmit the data acquired by the acquisition device to the further remote device and the processing unit is configured only to transmit and receive the data of the acquisition device 15 and from the further remote device and it is not configured to process the data from the acquisition device.

The further remote device may for example, be a computer connected to the remote device via the Internet.

In both cases, the remote device 55 comprises a displaying device 85, such as for example, an electronic display. Also the further remote device may comprise a displaying device in the form of an electronic display.

The above-described apparatus 1 is configured to carry out a method for estimating the time for which an endothermic motor of a tool has operated at predetermined rotating speeds, i.e. at about predetermined rotating speeds, in particular at least at one between the minimum rotating speed and the maximum rotating speed.

In particular, such estimate is differed, i.e. not in real time during the operation of the endothermic motor.

In particular, such method comprises a sequence of steps relative to acquiring data and storing data, for example carried out by the electronic control and command unit 45 of the acquisition device 15, and a sequence of steps relative to processing data acquired, for example carried out by the processing unit 60 of the remote device 55 and/or by the processing unit 80 of the further remote device 70. The method may also comprise a successive step of displaying processed data, for example carried out by the remote device 55, i.e. by the displaying device 85 thereof.

To carry out such method, it is necessary to position the inductive sensor 25, i.e. the acquisition device provided with the inductive sensor 25, within a predetermined distance from the endothermic motor of the tool so that the inductive sensor can pick up the magnetic field variations generated by the operation of the endothermic motor. For example, such distance is less than 10 cm. In particular, it is convenient to fasten the inductive sensor 25, i.e. the acquisition device, on the protective crankcase 10 of the tool.

Figure 7:
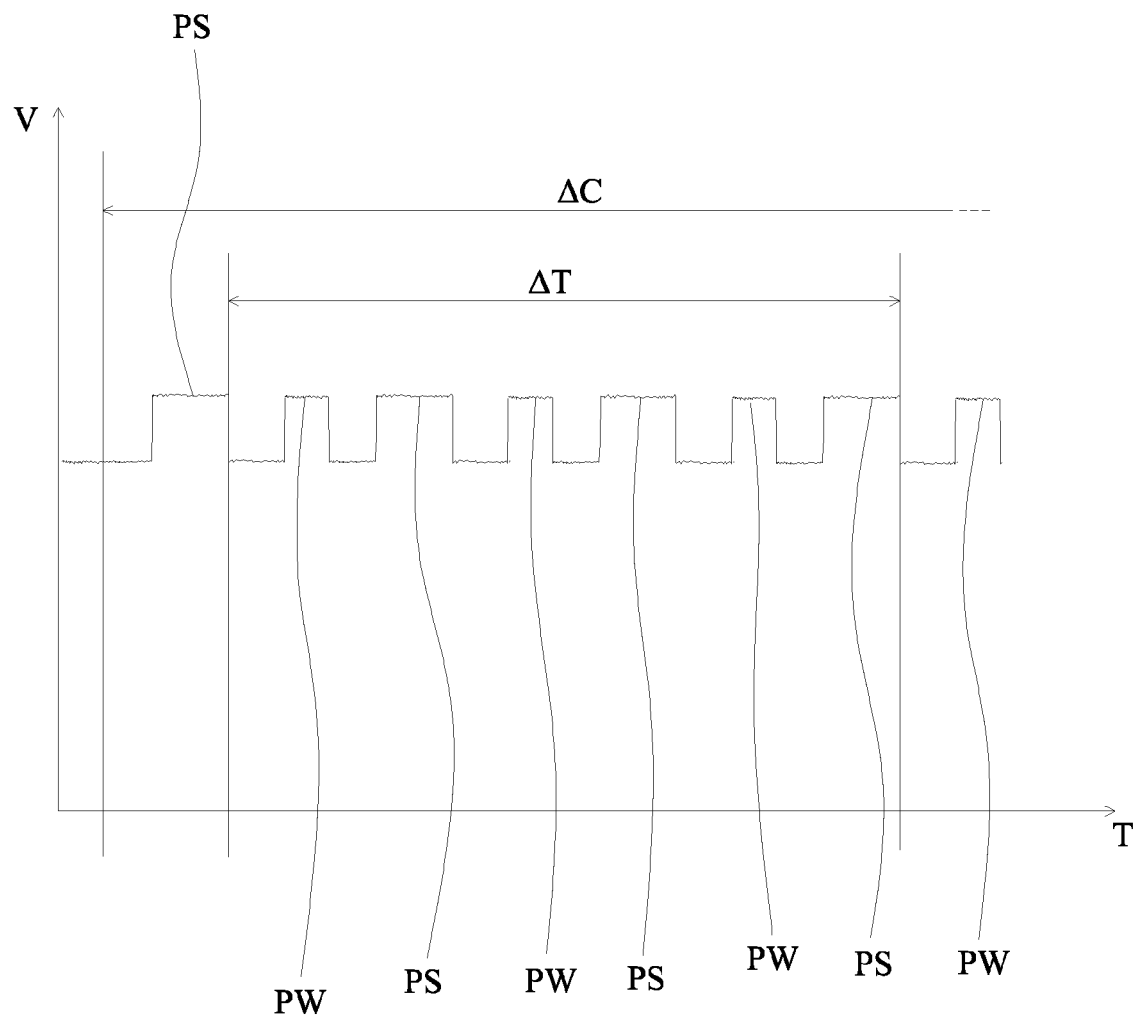
FIG. 7 is a graph of the variations in the electromagnetic field according to the situation depicted in FIG. 6, in which a pre-set sampling period ΔC and an overall time interval ΔT according to the invention are shown graphically.

The sequence of steps relative to acquiring and storing data comprises the step of cyclically measuring, at a pre-set sampling period ΔC, an overall time interval ΔT between a first and a last variation peak of the electromagnetic field, where the pre-set sampling period ΔC is greater than the overall time interval ΔT, i.e. than the maximum overall time interval measurable (see FIG. 7). For example, the pre-set sampling period ΔC may be set equal to 250 ms in order to allow an optimal balancing between electric energy consumption and measurement accuracy.

The step of cyclically measuring the overall time interval ΔT with sampling periods ΔC may be started manually by the operator by actuating the acquisition device by means of a suitable manual command or preferably, the actuation of such step may occur automatically based on the monitoring of eddy currents within the inductive sensor generated by the variations in electromagnetic field due to the operation of the endothermic motor. Reaching a predetermined variation value of the electromagnetic field, for example for a given period of time, actuates the beginning of the cyclical measuring.

The first and the last peak are the start and tail ends of a sequence of peaks PS, PW having a predetermined number of successive peaks, i.e. immediately successive to one another. The number of peaks of the sequence is a positive, whole number that is at least equal to six and a least common multiple at least of two and three.

In order to allow an optimal balancing between consumption of electric energy and measuring accuracy, in the embodiment illustrated (see FIG. 7) the number of peaks is equal to six, therefore a least common multiple of two and three.

It is worth noting that peak PS, PW means a variation in the electromagnetic field having greater intensity at a predetermined threshold value. Such threshold value is greater than an intensity value of average magnetic field measured during the operation of the endothermic motor.

Furthermore, the start and the end of the overall time interval ΔT measuring occur at a downward portion of the respective peak. As shown in the drawings, a peak PS, PW can be identified as a variation in electromagnetic field that has an upward portion followed by a portion having substantially constant intensity, which in turn is followed by a downward portion.

In detail, the step therefore provides sensing a decreasing gradient intensity of the electromagnetic field. The electronic control and command unit of the acquisition device is therefore configured to identify the decreasing gradients of variations in the electromagnetic field.

Alternatively or additionally, it may be provided to monitor the instants in which the electromagnetic field value decreases below a predetermined threshold value after an (immediate) previous increase was measured with respect to the threshold value, indicating such occurrence as the sensing of a peak.

In practice, the method provides, i.e. the electronic control and command unit is configured, to start the measuring of the overall time interval ΔT within a sampling period ΔC when it senses, in the manners described, a first peak, and successively to increase the value of a meter by one each time it senses a peak PS, PW. Once the meter reaches a number equal to the number of peaks of the sequence of peaks, it is provided to interrupt the measuring of the overall time interval while storing the datum and interrupting the measuring of the variations in electromagnetic field up to the start of a new sampling period ΔC.

The method herein introduced provides only measuring the time interval between the first peak and the last peak of said sequence of peaks PS, PW, and does not provide measuring the intensity of the peaks or the time the peaks last. This allows a significant savings in electric energy.

Successively, the sequence of steps relative to acquiring and storing data may comprise the step of storing, preferably in the volatile storage, the value of the overall time interval ΔT measured.

Then, the sequence of steps relative to acquiring and storing data comprises the step of obtaining, from the overall time interval measured, the respective frequency thereof.

In particular as is known, the frequency is calculated by dividing 1 by the overall time interval measured, which overall time interval is to have a value measured in seconds. In this manner, a frequency value in Hertz is obtained, i.e. $s^{-1}$.

The method provides making available a plurality of pre-set ranges of frequencies RF1, RF2, RF3, RF4, RF5, RF6, RF7 of the overall time intervals ΔT measured. I.e., the method provides making available a plurality of meters, each one of which being associated with a pre-set range of frequencies overall time intervals. By mere way of example, each range of frequencies has an amplitude of 5 Hertz, and overall the ranges start from 20 Hertz and end at 70 Hertz.

The values of the pre-set ranges of frequencies RF1, RF2, RF3, RF4, RF5, RF6, RF7 are for example, stored in the non-volatile storage 35.

The sequence of steps relative to acquiring and storing data comprises the step of increasing the number of occurrences of a corresponding range of frequencies RF1, RF2, RF3, RF4, RF5, RF6, RF7 of the overall time intervals ΔT by one each time an overall time interval having a frequency falling within the pre-set range of frequencies RF1, RF2, RF3, RF4, RF5, RF6, RF7 is measured.

I.e., it is provided to actuate the meter of the respective pre-set range of frequencies RF1, RF2, RF3, RF4, RF5, RF6, RF7 until the sum increases by one, i.e. the number of the occurrences increases by one, each time an overall time interval having a frequency falling within that pre-set range of frequencies is measured.

In detail, it may be provided for the electronic control and command unit to compare the frequency value of overall time intervals measured with the ranges of pre-set ranges of frequencies and to increase the occurrences by one when there is a correspondence between the value measured and the range stored in the memory.

It is worth noting that occurrence means the number of times that a given event is repeated over time. For example, if during the measuring period, the endothermic motor was sensed 100 times at a frequency of 30 Hertz, 100 times at a frequency of 31 Hertz, 100 times at a frequency of 32 Hertz, 100 times at a frequency of 33 Hertz and 100 times at a frequency of 34 Hertz, the number of the occurrences of a pre-set range of frequencies RF2 that goes from 30 to 34 Hertz therefore is 500 occurrences.

Figure 3:
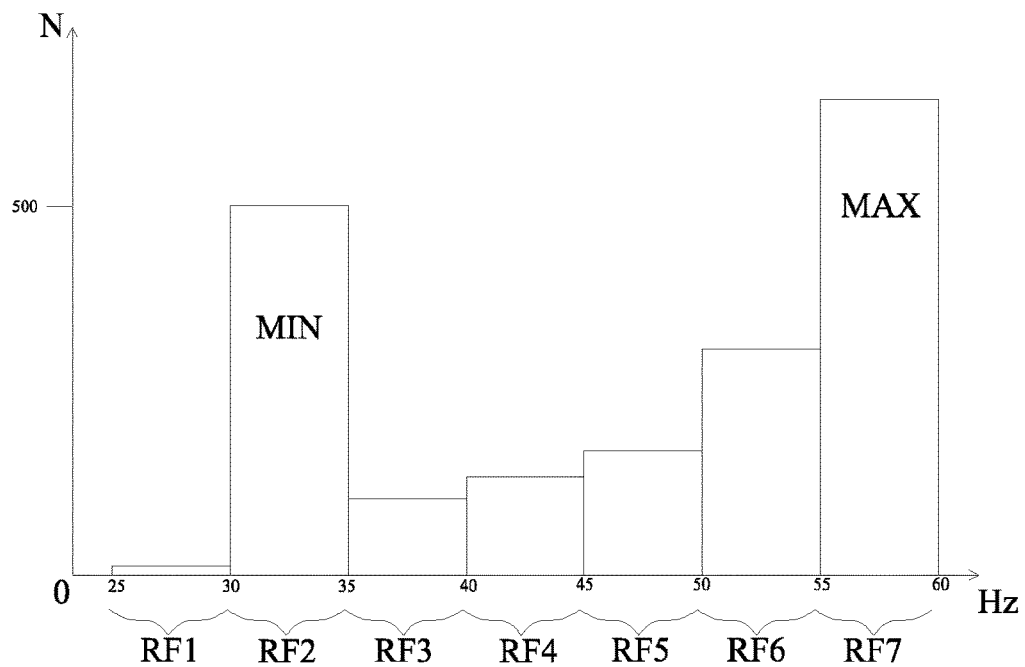
FIG. 3 is a histogram of the occurrences of the frequencies of overall time intervals measured by the acquisition device, which histogram may be processed by a remote device of the apparatus of FIG. 1. The X axis of such histogram depicts the frequency (measured in Hertz) and the Y axis is the number of occurrences.

FIG. 3 illustrates a graph of the occurrences created by means of the method hereinto introduced, in which the occurrences are on the Y axis, indicated with N (the occurrences do not have a unit of measurement) and the frequencies (in Hertz) are on the X axis and the pre-set ranges of frequencies RF1, RF2, RF3, RF4, RF5, RF6, RF7 are shown. Such graph of the occurrences illustrates a part of the present method and could be created and displayed during the method for checking the correct functioning of the method. However, the creation and/or display of such graph of the occurrences is not required for the correct functioning of the method.

If the acquisition device is provided both with a volatile storage and with a non-volatile storage, the sequence of steps relative to acquiring and storing the data may comprise the step of storing the number of occurrences in a corresponding range of frequencies in the volatile storage up to reaching a predefined maximum value, which when reached, the number of occurrences is stored in the non-volatile storage. It may also be provided that the number of occurrences stored in the non-volatile storage during such transfer from one storage to the other is one for each maximum value of occurrences reached in the volatile storage.

By way of example, an option of calibrating such step may provide setting the predefined maximum value at 240 so that reaching such maximum value corresponds to one operating minute of the motor within a pre-set range of frequencies, given that the sampling period is equal to 250 ms. In this way, it is possible for example, to increase the number of occurrences in the non-volatile storage by one each 240 occurrences in the same range of measured frequencies stored in the volatile storage, which means storing one operating minute at a predetermined speed of the thermal motor in the non-volatile storage. It is worth noting that it is not a continuous minute at a pre-set range of rotation frequencies, rather the indication that during the period of use, the motor has operated overall for one minute at rotation frequencies falling within a given range.

The method may also provide, in the case in which after sensing the activity of the endothermic motor it senses a non-use of the endothermic motor, for it to store the data measured in the non-volatile storage also in the case in which the predefined maximum value of occurrences was not reached.

The sequence of steps relative to acquiring and storing data concludes with storing the occurrences of the pre-set ranges of frequencies. Therefore, the operations carried out by the acquisition device 15 are concluded.

In particular, this step concludes after measuring at least one predetermined overall number of time intervals ΔT.

At this point, the method provides the step of transferring the values of occurrences of the pre-set ranges of frequencies from the acquisition device 15 to the remote device 55, which may in turn for example, send them to the further remote device 70.

The transfer of the data measured and stored may be carried out automatically, for example by nearing the remote device to the acquisition device until the respective transceiver means 40, 65 establish a communication between the two devices.

The sequence of steps relative to processing the data acquired starts with the step of comparing the number of occurrences of each pre-set range of frequencies RF1, RF2, RF3, RF4, RF5, RF6, RF7 of overall time intervals measured and of identifying the two with the largest number of occurrences, labelling between the two the pre-set range of frequencies having lowest, i.e. lower, frequencies as indicative of the range of rotation frequencies of the minimum speed and the other, i.e. having highest frequencies between the two, as indicative of the range of rotation frequency of the maximum speed.

In particular, it is provided to select the pre-set range of frequencies having the largest number of occurrences and having less frequencies with respect to a pre-set frequency value indicative of an intermediate rotating speed and indicating it as indicative of the range of rotation frequencies of the minimum speed. In particular, it is provided to select the pre-set range of frequencies having the largest number of occurrences and having less frequencies with respect to a pre-set frequency value indicative of an intermediate rotating speed and indicating it as indicative of the range of rotation frequencies of the minimum speed.

By way of example, such two ranges are indicated in FIG. 3 respectively as MIN, the pre-set range of frequencies RF2, which goes from 30 to 35 Hertz, and MAX, the pre-set range of frequencies RF7, which goes from 55 to 60 Hertz.

Then, an overall threshold frequency is calculated by calculating an arithmetic average between at least one frequency of the range of the minimum speed and one frequency of the range of the maximum speed. For example, to calculate such overall threshold frequency, it is possible to take the lowest end of the pre-set range of frequencies indicative of the rotation of the motor at the minimum speed, and the highest end of the pre-set range of frequencies indicative of the rotation of the motor at the maximum speed.

Then a plurality of corrective coefficients can be determined by dividing the number of peaks of the sequence of peaks respectively by one, and for each of the whole and positive numbers of which the number of peaks is a least common multiple. In detail, after determining the positive whole numbers of which the number of peaks is a least common multiple, a first corrective coefficient is obtained by dividing the number of peaks of the sequence of peaks by one, a second corrective coefficient is obtained by dividing the number of peaks by a positive whole number of which the number of peaks is a least common multiple, a third corrective coefficient is obtained by dividing the number of peaks by another positive whole number of which the number of peaks is a least common multiple, and so on. Obviously, it is excluded to calculate a corrective coefficient by dividing the number of peaks by its same number because the corrective factor would be equal to one, therefore it would not be a corrective factor.

In the embodiment illustrated in which the number of peaks is six, six is divided by one, by two and by three, thus obtaining six, three and two as corrective factors. The corrective factor of six is to be applied to a situation in which out of six peaks, each peak measured of the sequence of peaks is due to a variation in magnetic field caused by the sparking spark, the corrective factor of three is to be applied to a situation in which out of six peaks, only three are due to a variation in magnetic field caused by the sparking spark because one variation in electromagnetic field of another nature, in particular due to the rotation of the free wheel, is interposed every two variations in electromagnetic field due to the sparking spark. The corrective factor of two is to be applied to a situation in which out of six peaks, two are due to a variation in magnetic field caused by the sparking spark because two variations in electromagnetic field of another nature are interposed every two variations in electromagnetic field due to the sparking spark.

The sequence of steps relative to processing the data acquired continues with calculating a plurality of rotation frequencies by multiplying, for each corrective coefficient of the plurality of corrective coefficients, a frequency value of the range of frequencies of the minimum speed, preferably the lowest end of the frequency range of the minimum speed.

After, the values of the calculated rotation frequencies are compared with a (pre-set) reference range of frequencies indicative of the idling of the endothermic motor. For example, such reference range of frequencies indicative of the idling of the endothermic motor comprises the frequencies corresponding to the operation of the motor between a minimum of 2200 rpm and a maximum of 4000 rpm.

Usually all the engines used in the tools have an idle speed included in this range. Such reference range of frequencies indicative of the idling may for example, be stored in a non-volatile storage of the remote device or of the further remote device.

The sequence of steps relative to processing the data acquired continues with storing the corrective coefficient of the plurality of corrective coefficients corresponding to the rotation frequency falling within the reference range of frequencies indicative of the idling of the endothermic motor, as a corrective coefficient of the low speeds, and calculating a representative rotation frequency for each pre-set range of frequencies lower than the threshold frequency, multiplying a frequency value of each range by the corrective coefficient of the low speeds. Preferably, the frequency value of each pre-set range of frequencies to be multiplied by the corrective coefficient of the low speeds is the lowest end of said range.

Then the calculated representative rotation frequencies are stored, for example in the non-volatile storage of the remote device or of the further remote device, according to which of the two processes the data.

The sequence of steps relative to processing the data acquired continues with calculating a plurality of rotation frequencies by multiplying, for each corrective coefficient of the plurality of corrective coefficients, a frequency value of the range of frequencies of the maximum speed, preferably the highest end of the frequency range of the maximum speed.

After, the values of the calculated rotation frequencies are compared with a (pre-set) reference range of frequencies indicative of the maximum running of the endothermic motor.

For example, in order to increase the accuracy, the method may provide making available a database of a plurality of types of tools provided with endothermic motors, comprising for example the ones listed above, in which each type of tool is associated with a predefined reference range of frequencies indicative of the maximum running of the endothermic motor of said type of tool. Therefore, it is provided to allow selecting a type of tool from the database of the plurality of types of tools and the reference range of frequencies indicative of the maximum running of the endothermic motor associated with the type of tool selected to perform the comparison step between the values of the calculated rotation frequencies with the reference range of frequencies indicative of the maximum running of the endothermic motor.

The method may provide for such foresight to be present also for the reference frequency values of the minimum speed.

Such reference range of frequencies indicative of the maximum running may for example, be stored in a non-volatile storage of the remote device or of the further remote device.

The sequence of steps relative to processing the data acquired continues with storing the corrective coefficient of the plurality of corrective coefficients corresponding to the rotation frequency falling within the reference range of frequencies indicative of the maximum running of the endothermic motor as a corrective coefficient of the high speeds, and calculating a representative rotation frequency for each pre-set range of frequencies higher than the threshold frequency, multiplying a frequency value of each pre-set range of frequencies by the corrective coefficient of the high speeds. Preferably, the frequency value of each pre-set range of frequencies to be multiplied by the corrective coefficient of the high speeds is the highest end of the range.

Then the calculated representative rotation frequencies are stored, preferably in the non-volatile storage of the remote device or of the further remote device.

Then the operating time in which the motor has operated at the rotation frequencies of each pre-set range of frequencies is determined by multiplying the number of occurrences of each range of frequencies by the value of the pre-set sampling period $\Delta C$, and associating, in the sense of connecting until there is a bi-unique connection, the operating times calculated at the corresponding pre-set ranges of frequencies.

If there are both the volatile storage and the non-volatile storage, the calculation is made on the occurrences stored in the non-volatile storage, therefore the number of the occurrences is already representative of the operating minutes of the motor.

At this point, the method may provide transforming the value of the calculated representative rotation frequencies into revolutions per minute, i.e. rpm. Such transformation of measurement unit occurs by multiplying the value of the frequencies in Hertz by 60.

Figure 4:
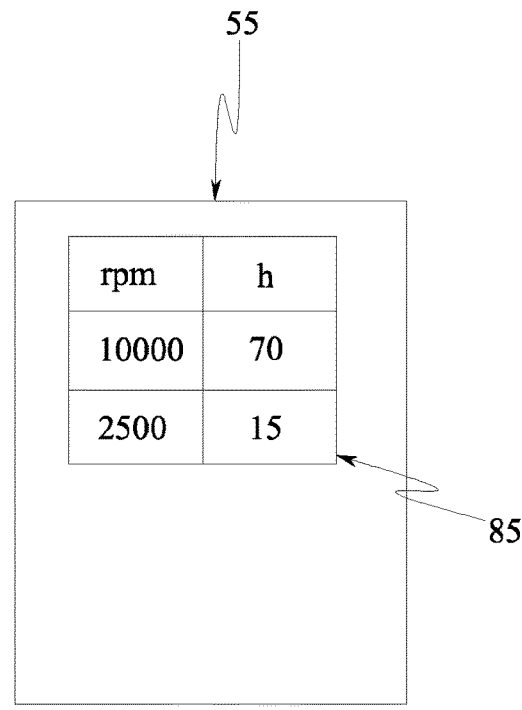
FIG. 4 is a schematic depiction of a report that may be processed by the remote device of the apparatus according to the invention.
Figure 5:
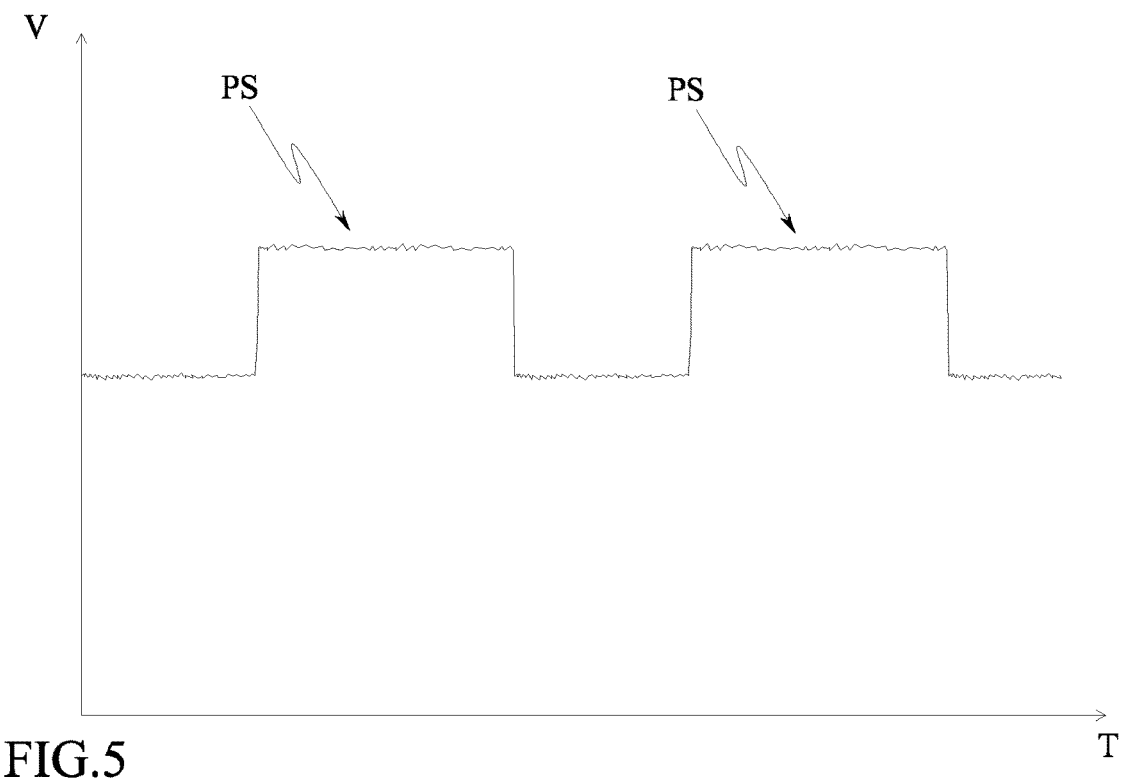
FIG. 5 is a graph of the variations in electromagnetic field at a predetermined distance from the endothermic motor of the tool of FIG. 2 when the acquisition device senses only the variations in electromagnetic field due to the sparking spark. The Y axis of such graph represents the increasing intensity of electromagnetic field measured by an inductive sensor according to the invention (therefore represented in volts V) and the X axis represents the increasing time T.
Figure 6:
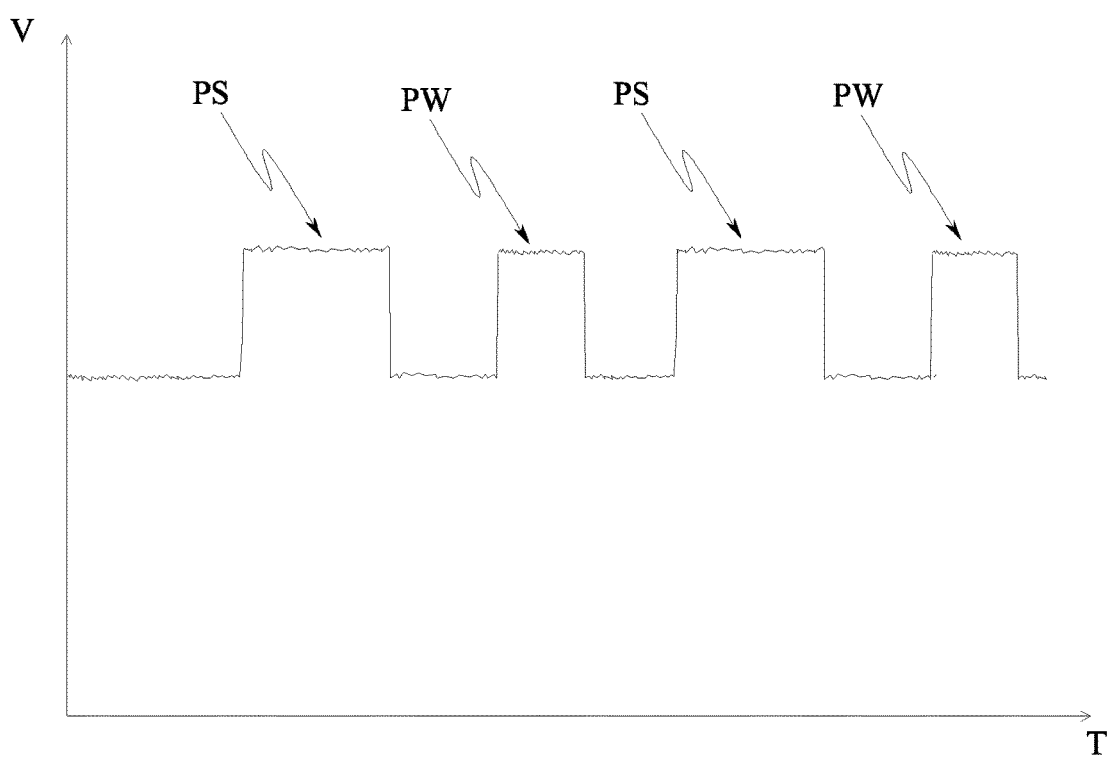
FIG. 6 is a graph of the variations in electromagnetic field at a predetermined distance from the endothermic motor of the tool of FIG. 2 when the acquisition device senses variations in electromagnetic field due both to the sparking spark and to those due to the free wheel of the motor. In particular, the graph depicts the situation in which there is a peak due to the rotation of the free wheel of the motor between two variation peaks of the electromagnetic field due to the sparking spark. The Y axis of such graph represents the increasing intensity of electromagnetic field measured by an inductive sensor according to the invention (therefore represented in volts V) and the X axis represents the increasing time T.

The method may also provide the step of displaying, on the displaying device 85, such as for example illustrated in FIG. 4, a report indicating, for each calculated representative rotation frequency value, preferably displayed in revolutions per minute, the operating time associated therewith.

Alternatively or additionally to this displaying step, the method may provide comparing the operating time values associated with pre-selected values of representative rotation frequencies with predetermined threshold values of the operating time at a given rotating speed and generating an alarm signal if such threshold value is exceeded. For example, the method may provide comparing the operating time value of the representative frequency value corresponding to the pre-set range of frequencies of the maximum speed with a pre-set threshold value of the operating time of the motor at maximum speed.

Although a method has been hereinto illustrated in which a frequency is obtained from the overall time interval and the successive steps provide processing such calculated frequencies, a method in which such frequency is not obtained and the successive steps are a function of the time interval is totally equivalent, with attention to analysing the occurrences of the values measured while considering that the column indicative of maximum rotating speed is now at values—they being time intervals—that are lower than an average value between the two maximum columns of the occurrences, while the column indicative of the idling rotating speed now has greater values with respect to the average value between the two maximum columns.

It is not excluded, in an embodiment not shown, for the whole method up to the part of associating the operating time with the predetermined rotating speeds, to be carried out by the acquisition device alone. Here, the remote device only carries out the step of displaying the data obtained, i.e. of creating a report of such data. Such embodiment would lose the advantage of the reduced consumption of the battery of the acquisition device 15 when not assigned to processing data and would also lose the advantage of a particularly simple, therefore robust and affordable, acquisition device, however it would in any case allow obtaining the advantages associated with the features of claim one.

The operation of the apparatus of the method according to the invention is as follows. The user installs the acquisition device 15 on the protective crankcase 10 of the tool, for example by fastening it by means of an adhesive or non-removable connection members or removable connection members. Then, during the operation of the endothermic motor of the tool, the acquisition device stores the data that will be obsessively processed by the remote device 55 or by the further remote device 70. In particular, once the use of the tool is complete, the user may near the remote device 55 to the acquisition device 15 so that a wireless communication is established between the two such as to allow the transfer of the data acquired to the remote device. According to the configuration, the data acquired may be processed directly by the remote device or sent for processing to the further remote device. If they are sent to the further remote device 70, the data acquired are stored simultaneously in the remote device 55 until it is possible to establish a connection between the remote device and the further remote device. Once the data have been processed to obtain the operating times at representative rotating speeds, such data are displayed in the displaying device, for example in the form of a report as in FIG. 4.

The invention thus conceived is susceptible to many modifications and variants, all falling within the same inventive concept.

Moreover, all the details can be replaced by other technically equivalent elements. In practice, any materials and also any contingent shapes and sizes may be used, depending on the needs, without departing from the scope of protection of the following claims.

The invention claimed is:

1. A method for estimating, by measurements taken by an inductive sensor (25), a time for which an endothermic motor of a tool (5) has operated at predetermined rotating speeds so as to estimate a wear of the tool, said method comprising the following steps:
   arranging said inductive sensor (25) in an external acquisition device (15);
   cyclically measuring, at a pre-set sampling period (ΔC), an overall time interval (ΔT) by starting a beginning of the measuring of the overall time interval (ΔT) when a first variation peak of an electromagnetic field, generated by the endothermic motor when the tool operates, is sensed by the inductive sensor (25) and terminating the measuring of the overall time interval when a last variation peak of the electromagnetic field, generated by the endothermic motor when the tool operates, is sensed by the inductive sensor (25), where a first and a last peak are the start and tail ends respectively of a sequence of peaks having a predetermined number of successive peaks, said predetermined number of peaks being positive, whole, at least equal to six and a least common multiple at least of two and three,
   obtaining, from the overall time interval (ΔT) measured, the respective frequency thereof,
   making available a plurality of pre-set ranges of frequencies (RF1, RF2, RF3, RF4, RF5, RF6, RF7) of the overall time intervals measured which have previously stored,
   increasing the number of occurrences of a corresponding pre-set range of frequencies (RF1, RF2, RF3, RF4, RF5, RF6, RF7) by one each time the overall time interval (ΔT) having a frequency falling within the pre-set range of frequencies is measured,
   selecting, among the plurality of pre-set ranges of frequencies (RF1, RF2, RF3, RF4, RF5, RF6, RF7), the two pre-set ranges of frequencies having the largest number of occurrences, of which one with the lowest frequency represents the pre-set range of frequencies of a minimum speed and one with the highest frequency represents the pre-set range of frequencies of a maximum speed,
   calculating an overall threshold frequency by calculating an arithmetic average between at least one frequency of the range of frequencies of the minimum speed and one frequency of the range of frequencies of the maximum speed,
   determining a plurality of corrective coefficients, each obtained by dividing the number of peaks of the sequence of peaks respectively by one, and for each of the whole and positive numbers of which the number of peaks is a least common multiple,
   calculating a plurality of rotation frequencies by multiplying, for each corrective coefficient of the plurality of corrective coefficients, a frequency value of the range of frequencies of the minimum speed,
   comparing values of the calculated rotation frequencies with a pre-set reference range of frequencies indicative of an idling of the endothermic motor,
   storing a corrective coefficient of the plurality of corrective coefficients corresponding to the rotation frequency falling within the pre-set reference range of frequencies indicative of the idling of the endothermic motor, as a corrective coefficient of low speeds,
   calculating a first representative rotation frequency for each pre-set range of frequencies which are lower than the threshold frequency by multiplying the frequency value of each range by the corrective coefficient of the low speeds,
   storing the first calculated representative rotation frequencies,
   calculating a plurality of rotation frequencies by multiplying, for each corrective coefficient of the plurality of corrective coefficients, a frequency value of the range of frequencies of the maximum speed,
   comparing the values of the calculated rotation frequencies with a reference range of frequencies indicative of a maximum running of the endothermic motor,
   storing the corrective factor corresponding to the rotation frequency falling within the range of frequencies indicative of the maximum running of the endothermic motor as corrective factor of the high speeds,
   calculating a second representative rotation frequency for each pre-set range of frequencies which are greater than the threshold frequency by multiplying a frequency value of each range greater than the threshold frequency by the corrective factor of the high speeds,
   storing the second calculated representative rotation frequencies, and
   determining the operating time in which the motor has operated at the rotation frequencies of each pre-set range of frequencies by multiplying the number of occurrences of each pre-set range of frequencies by the value of the pre-set sampling period (ΔC), and indicating the wear of the tool based on the operating time.

2. The method according to claim 1, further comprising:
   making available a database of a plurality of types of tools provided with endothermic motors, in which each type of tool is associated with the reference range of frequencies indicative of the maximum running of the endothermic motor of said type of tool,
   allowing a selection of a type of tool from the database of the plurality of types of tools, and
   using the reference range of frequencies indicative of the maximum running of the endothermic motor associated with the type of tool selected to perform the comparison step between the values of the calculated rotation frequencies with the pre-set frequency range indicative of the maximum running of the endothermic motor.

3. The method according to claim 1, wherein the step of measuring at least one predetermined overall number of time intervals (ΔC) comprises the step of accelerating the endothermic motor of the tool (5) at least once from the idling rotating speed to the maximum rotating speed.

4. An apparatus (1) for deferred estimation of time for which an endothermic motor of a tool (5) has operated at predetermined rotating speeds, said apparatus comprising an acquisition device (15) comprising:
- an inductive sensor (25),
- a storage unit (30, 35),
- a wireless transmitter (40),
- a power supply battery (50), and
- an electronic control and command unit (45) operatively connected to the inductive sensor, the wireless transmitter and the storage unit, the electronic control and command unit (45) being configured to:
  - cyclically measure, at a pre-set sampling period, an overall time interval by starting the beginning of the measuring of the overall time interval when a first variation peak of the electromagnetic field is sensed and terminating the measuring of the overall time interval when a last variation peak of the electromagnetic field is sensed, where the first and the last peak are the start and tail ends of a sequence of peaks having a predetermined number of successive peaks, said number of peaks being positive, whole, at least equal to six and a least common multiple of at least of one, two and three,
  - obtain, from the overall time interval measured, a respective frequency thereof,
  - provide a plurality of pre-set ranges of frequencies of the overall time intervals measured,
  - increase a number of occurrences of a corresponding range of frequencies by 1 each time an overall time interval having said frequency is measured, the apparatus (1) further comprising a remote device (55) provided with:
- a wireless receiver (65),
- a processing unit (60) operatively connected to the wireless receiver and configured to carry out the steps of the method of claim 1, from the step of selecting two ranges of frequencies of the plurality of ranges of frequencies having the largest number of occurrences, up to the last step of the method.

5. The apparatus (1) according to claim 4, wherein the remote device (55) comprises a displaying device (85) and wherein the processing unit (60) is configured to show a report on the displaying device showing, for each calculated representative rotation frequency value, the operating time associated therewith.

* * * * *